(12) United States Patent
Derocher et al.

(10) Patent No.: US 6,476,795 B1
(45) Date of Patent: Nov. 5, 2002

(54) MOUSE RECHARGING MODULE

(75) Inventors: Michael D Derocher, Corvallis, OR (US); Jacques H Helot, Rotterdam (NL)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/491,081

(22) Filed: Jan. 20, 2000

(51) Int. Cl.⁷ .................................................. G09G 5/08
(52) U.S. Cl. ........................ 345/163; 345/156; 345/157; 345/167; 345/168; 345/169; 361/683; 361/686; 320/114; 320/115
(58) Field of Search ................................. 345/156, 157, 345/163, 167–169, 179; 361/683, 686; 320/114, 115

(56) References Cited

U.S. PATENT DOCUMENTS

| | | | | |
|---|---|---|---|---|
| 5,260,696 A | * | 11/1993 | Maynard, Jr. ............... | 345/163 |
| 5,416,479 A | * | 5/1995 | Jondrow et al. ............... | 341/20 |
| 5,861,873 A | * | 1/1999 | Kikinis ........................ | 345/157 |
| 5,886,686 A | * | 3/1999 | Chen ........................... | 345/168 |
| 5,920,306 A | * | 7/1999 | Kikinis ........................ | 345/158 |
| 6,091,404 A | * | 7/2000 | Hong et al. .................. | 345/167 |
| 6,188,392 B1 | * | 2/2001 | OConnor et al. ........... | 345/179 |
| 6,205,021 B1 | * | 3/2001 | Klein et al. ................. | 345/167 |
| 6,219,037 B1 | * | 4/2001 | Lee ............................. | 345/167 |
| 6,304,250 B1 | * | 10/2001 | Yang et al. .................. | 345/168 |
| 6,307,745 B1 | * | 10/2001 | Liebenow .................... | 361/686 |
| 6,369,798 B1 | * | 4/2002 | Yatsu et al. ................. | 345/158 |

* cited by examiner

Primary Examiner—Richard Hjerpe
Assistant Examiner—Henry N. Tran
(74) Attorney, Agent, or Firm—Timothy F. Myers

(57) ABSTRACT

A portable computer system has a screen attached to a base housing having an accessory bay and a first wireless transceiver. The screen has a cursor positioned by a mouse having a second wireless transceiver in contact the first wireless transceiver of the portable computer. A module, capable of insertion and removal from the accessory bay, has a mouse bay and connector for coupling to the mouse. When the mouse is in the mouse bay, a battery in the mouse is recharged.

18 Claims, 4 Drawing Sheets

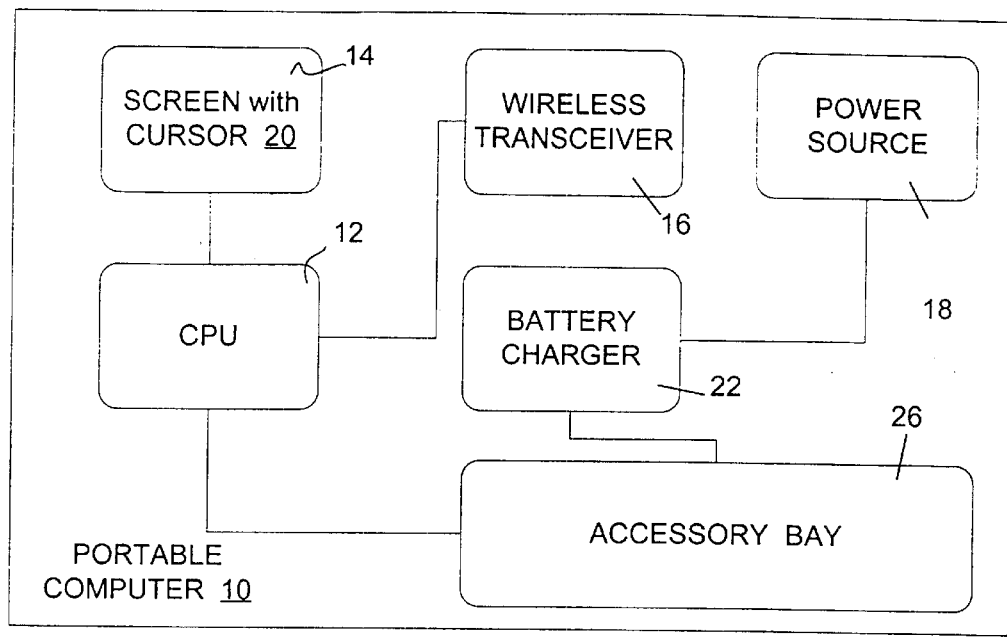
Fig. 1
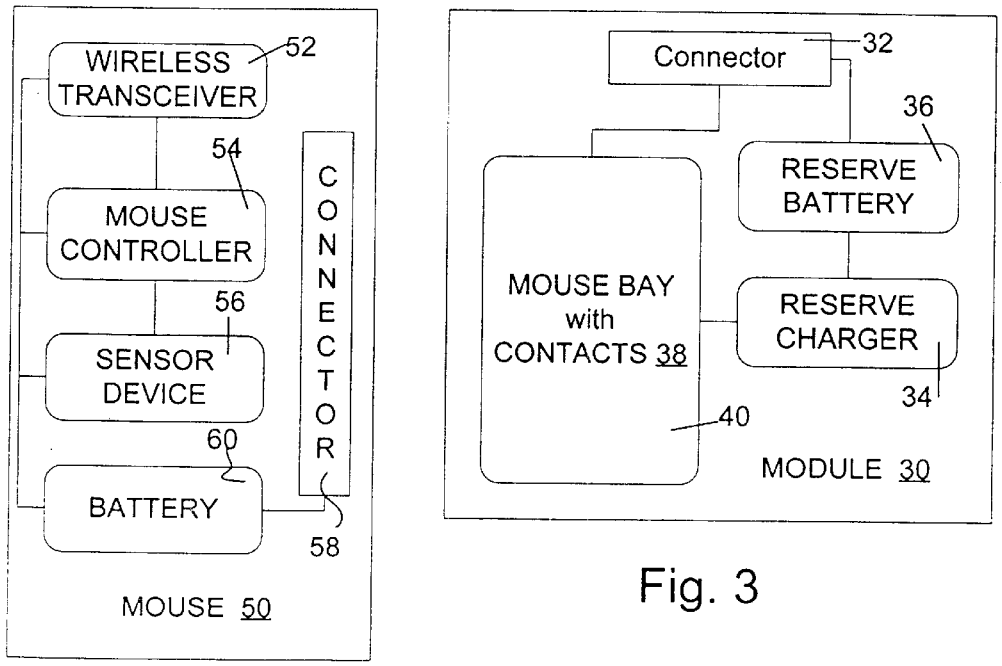
Fig. 2
Fig. 3

MOUSE RECHARGING MODULE

FIELD OF THE INVENTION

The invention relates to a wireless mouse for a portable computer, more specifically, it relates to charging a battery within the mouse by using a module for an accessory port of the portable computer.

BACKGROUND OF THE INVENTION

Manufacturers of portable computers have been successful in incorporating most of the features of a desktop computer into small lightweight packages. The convenience of having desktop performance in a transportable package has enabled people to become increasing mobile while performing their jobs. The ability to perform the same tasks on a portable computer as on a traditional desktop computer has increased productivity by reducing the need to relearn new skills. However, due to size constraints, portable computer manufacturers have struggled to find an acceptable replacement for the desktop mouse input device.

Early portable computers simply provided for adding an external mouse by having it plug into a standard PS/2 or serial mouse port. Because desk space is often times limited (such as on an airline tray table); manufactures tried several different types of input devices. The first attempt was to simply turn the mouse upside down and attach it to the case, thereby providing a "trackball" type input device. The inconvenience of having to mount and dismount the trackball when setting up and packing away the portable computer led manufactures to integrate the trackball into the portable computer package. While the trackball was very popular as an input device, the trackball became disfavored as it was often unreliable. This unreliability was because the ball became stuck due to hair, oil, grease, and dirt fouling the pointing mechanism. At the same time, the trend in portable computers was to make the package thinner. The next progression in portable input devices was the incorporation of a pressure sensing "trackpoint" device into the keyboard itself. This trackpoint device allowed the portable computer package to be reduced even further as it allowed for the elimination of a palmrest where the integrated trackball normally was mounted. However, due to the drive towards larger display panel sizes and ergonomic considerations, the palmrest was reincorporated back into the portable computer. In addition, because the trackpoint was difficult to use for long periods of time, another input device, the "trackpad" was developed to occupy the palmrest area. The trackpad is a typically flat surface that uses either capacitive or resistive sense technology to detect movement of a finger on the flat surface. While the trackpad has had considerable success, many users complain of having to use a different pointing device on their portable computer than the standard mouse of their desktop computer.

One attempt to allow the user to have a mouse like pointing device is the "paw" found in the Hewlett-Packard Omnibook 300 portable computer (see commonly assigned U.S. Pat. No. 5,428,355). The "paw" was an input device that required no keyboard surface area. It included a retractable and extendable handle that could be stored in the computer when not in use. When required, the user would press a button which would "pop" the "paw" out of the package. The "paw" was attached to the portable computer with the extendable handle and could only be used in close proximity to the portable computer. Further, due to the sensing system used, each time the "paw" was popped out of the package, it would have to be calibrated by the user by moving it through its full range of motion.

While several different approaches have been used by manufacturers to replace the mouse on portable computers, none have achieved the popularity and usability of that of the desktop mouse. What users desire is a simple, compact, and convenient method by which they can operate their portable computers with a mouse type input device.

SUMMARY

A portable computer system has a screen attached to a base housing having an accessory bay and a first wireless transceiver. The screen has a cursor positioned by a mouse having a second wireless transceiver in contact the first wireless transceiver of the portable computer. A module, capable of insertion and removal from the accessory bay, has a mouse bay and connector for coupling to the mouse. When the mouse is in the mouse bay, a battery in the mouse is recharged.

BRIEF DESCRIPTION OF THE DRAWINGS

FIG. 1 is a block diagram of a portable computer that incorporates an embodiment of the invention.

FIG. 2 is a block diagram of a mouse, which incorporates a wireless transceiver and battery.

FIG. 3 is a block diagram of a module, which incorporates an embodiment of the invention.

DETAILED DESCRIPTION OF THE PREFERRED AND ALTERNATE EMBODIMENTS

Figure 4:
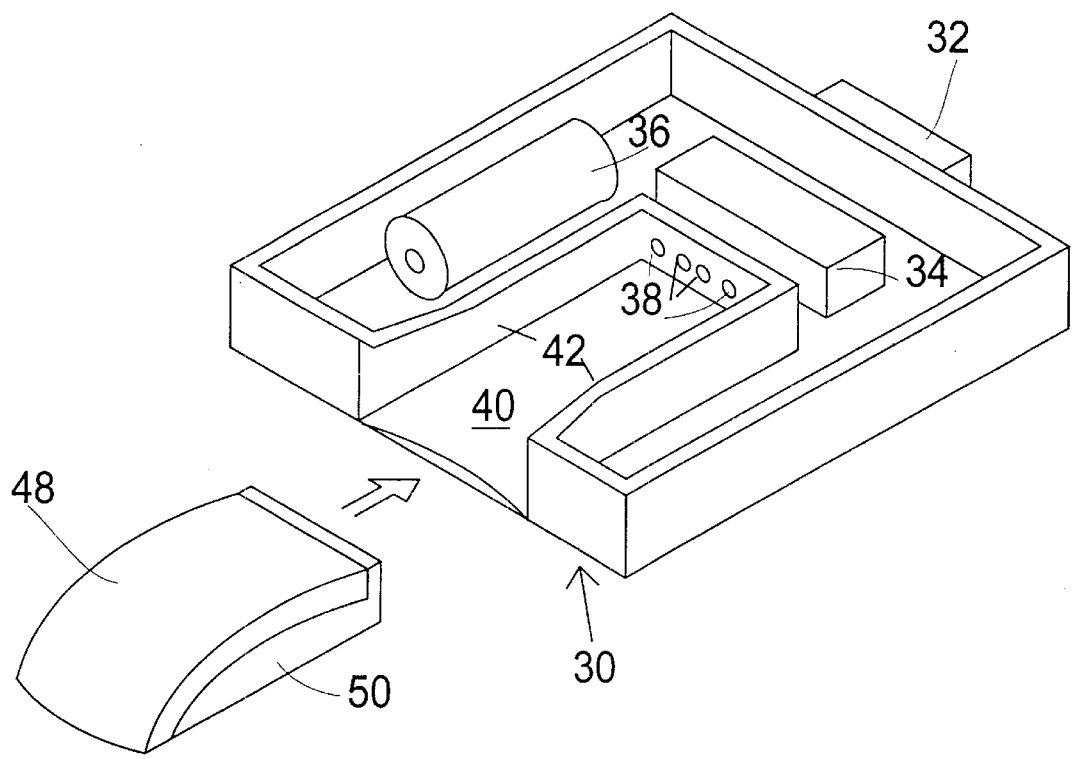
FIG. 4 is a perspective illustration of a module, which accepts and recharges a battery operated wireless mouse.

The invention provides a simple, compact, and convenient method of providing a mouse type device for a portable computer. By preferably combining an optical sensing mouse in a retractable package with a wireless link, desktop mouse functionality is achieved. However, to power the optical sensing circuits and wireless link, the mouse has a battery power source. To prevent the user from having to carry a supply of replacement batteries, the mouse battery is preferably rechargeable. One aspect of the invention is to provide an accessory module for an accessory bay in the portable computer. The accessory module has positioning walls that allow the mouse to be docked and connected to a recharging circuit. Another aspect of the invention is to allow the mouse to be recharged whether or not the accessory module is inserted into the accessory bay of the portable computer. Further aspects will become apparent in the detailed description of embodiments of the invention.

FIG. 1 is a block diagram of a portable computer 10 that has an accessory bay 26 for accepting various accessories such as compact disc readers, floppy disk drives, spare battery modules, zip drives, and hard disk drives. The portable computer 10 has a screen 14 that can display a cursor 20, typically used to highlight or select information on screen 14. In most portable computers, a pointing device such as a touch pad, trackpoint, or trackball is used to control the movement of the cursor 20 on the screen 14. However, several users prefer to use a conventional mouse to control the cursor 20, as that is what they are familiar with. The portable computer 10 provides a wireless transceiver 16, which is preferably integrated within the electronics of the portable computer 10. Optionally, the wireless transceiver 16 is an external device which connects to a PS/2 or USB port of the portable computer. With either method of incorporating the wireless transceiver 16, the wireless transceiver 16 is connected to central processing unit (CPU) 12 of the portable computer. The CPU 12 reads the data received from a wireless mouse 50 and controls the sending of the information by sending data to the wireless mouse 50. Preferably, the wireless interface of the transceiver uses the Bluetooth™ radio frequency (RF) local area protocol. Optionally, the wireless transceiver may be implemented using Infra-Red (I/R) technology. In addition, the wireless mouse preferably uses an optical sensor to allow for a compact unit, however, a conventional mechanical ball still meets the spirit and scope of the invention.

The portable computer 10 further has a power source 18, such an AC power, a DC power supply (i.e. car adapter), or an internal battery, that is used to power the electronics within the portable computer 10. This power source 18 is preferably coupled to a battery charger 22 that is further coupled to an accessory bay 26. The battery charger may be either a voltage limited, current limited, or both voltage and current limited power source depending on the type of battery that is expected to be recharged by the battery charger 22. The accessory bay 26 is a typical accessory or module bay for a portable computer. The battery charger 22 is coupled to the accessory bay 26 preferably through an accessory bay interface used to communicate with CPU 12.

FIG. 2 is a block diagram of the wireless mouse 50. The wireless mouse 50 incorporates a wireless transceiver 52 for communicating between and being in contact with the wireless transceiver 16 of the portable computer 10. The data sent and received by the wireless transceiver 52 is coupled to a mouse controller 54. The mouse controller 54 uses a sensor device 56, preferably optical, to detect movement direction and speed and to translate the detected movement into horizontal and vertical directions. These directions are sent to the portable computer 10 using the wireless transceiver 52. The wireless mouse 50 has a mouse battery 60 that is used to power the wireless transceiver 52, the mouse controller 54, and the sensor device 56. The mouse battery is also coupled to a mouse connector 58, which is used to interface the mouse battery to a battery recharger. The mouse battery is preferably a Lithium Ion type battery, but optionally could be a nickel metal hydride, nickel cadmium, or rechargeable alkaline type battery. The battery is preferably replaceable in case of failure, though generally, the battery will not often need replacement due to the battery having the ability to be recharged.

FIG. 3 is a block diagram of a module 30 that has a module connector 32 for interfacing with the accessory bay 26 of the portable computer 10. The module connector is coupled to a mouse bay 40 that accepts the wireless mouse 50. When the wireless mouse 50 is fitted into the mouse bay 40, the mouse connector 58 encounters contacts 38, which are coupled to the module connector 32. These contacts 38 allow the mouse battery 60 to become recharged.

Optionally, the module 30 contains a reserve battery 36 and a reserve charger 34. The reserve battery 36 and reserve charger 34, if implemented, are used to recharge the mouse battery 60 even if the module 30 is not inserted into the portable computer 10. The reserve battery 36 is recharged by the battery charger 22 (FIG. 1) of the portable computer 10 when the module 30 is inserted into the portable computer 10. When another accessory (such as a CD-ROM) is needed in the portable computer 10, the user can still use the module 30 to recharge the mouse battery 60. The reserve charger 34 may be a "buck", "boost" or other topology charger depending on the relative choices of cell configurations of the mouse battery 60 and the reserve battery 36.

FIG. 4 is a perspective illustration of the wireless mouse 50 and the module 30. The module 30 is shown as having a mouse bay 40 formed by positioning walls 42. The mouse bay 40 also has contacts 38 that provide the coupling from a battery charger to the mouse battery 60 (not shown) within the mouse. The module 30 couples the contacts 38 to the module connector 32, which interfaces to an accessory bay 26 (see FIG. 5) on the portable computer 10. Optionally, the module contains a reserve battery 36 and a reserve charger 34. If the reserve battery 36 and the reserve charger 34 are implemented, the reserve battery 36 is connected to the module connector 32 to allow the portable computer 10 to charge reserve battery 36. The reserve battery 36 is further connected to the input of reserve charger 34. The output of reserve charger 34 is connected to the contacts 38 to recharge the mouse battery 60 even if the module 30 is not inserted into the portable computer 10.

Wireless mouse 50 is preferably implemented with a retractable cover 48. Because most accessory bays on portable computers are designed to have as small a height as necessary to support the accessory devices, a typical mouse will have too much height to fit within both the module and the portable computer. A retractable mouse is described in commonly assigned U.S. Pat. No. 6,304,249 issued Oct. 16, 2001, which is hereby incorporated within.

Figure 5:
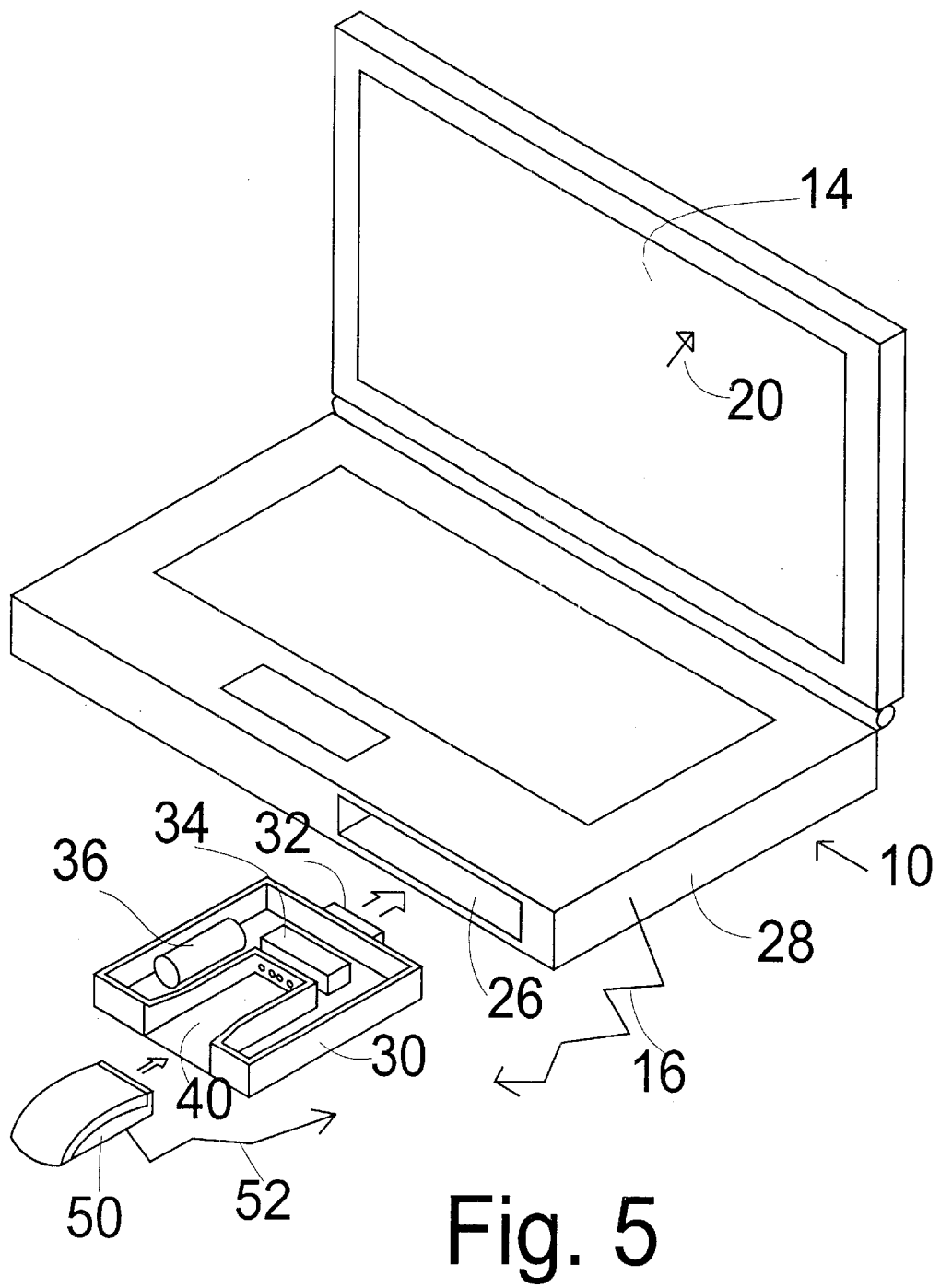
FIG. 5 is a perspective illustration of a portable computer system, which accepts the mouse-recharging module, and which communicates with the radio controlled mouse.

FIG. 5 is a perspective illustration of a portable computing system having a portable computer 10 with an accessory bay 26 in a base 28. A display 14 is attached to the base 28, preferably with a rotating hinge. The display allows a user to view information from the portable computer 10. The user can highlight or select information on the screen using a cursor 20. A wireless mouse 50 using wireless transceiver 52 to a wireless transceiver 16 in the portable computer 10 controls the cursor 20. A rechargeable battery preferably powers the wireless mouse 50. When the mouse battery need to be recharged, the user fits the wireless mouse 50 into a mouse bay 40 in a module 30. The module 30 makes contact with a battery charger within the portable computer 10 using module connector 32. Optionally, the module 30 has a reserve battery 36 and a reserve charger 34 which are used to recharge the battery in the wireless mouse 50 even if the module 30 is not fitted within portable computer 10. The reserve battery 36 is itself recharged when the module 30 is placed in accessory bay 26 of the portable computer 10.

Figure 6:
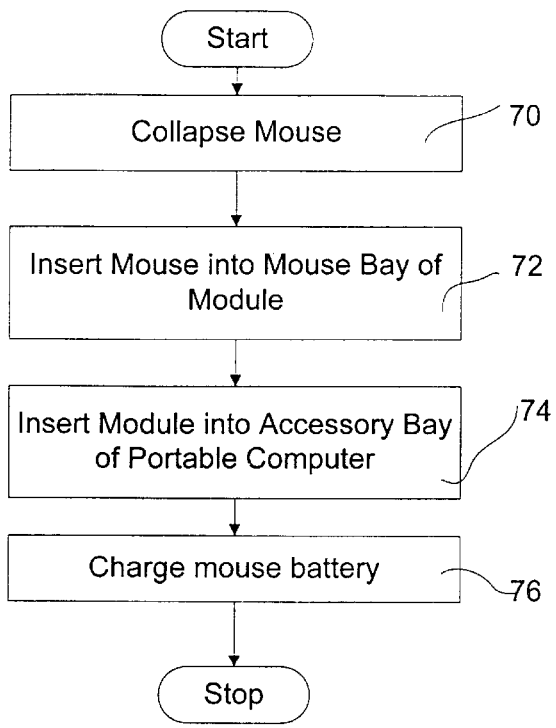
FIG. 6 is a flow chart of a process to recharge the battery in the mouse.

FIG. 6 is a flowchart of one process by which the wireless mouse 50 is recharged. In step 70, the wireless mouse, if collapsible, is collapsed to fit within the mouse bay 40 of module 30. Then in step 72, the wireless mouse 50 is inserted into the mouse bay 40 of module 30. Next in step 74, the module 30, with the wireless mouse 50, is inserted into the accessory bay 26 of the portable computer 10. Then in step 76 the battery charger 22 of the portable computer recharges the mouse battery 60. Optionally, if the reserve battery 36 and the reserve charger 34 are included in the module 30, then just inserting the wireless mouse 50 into the mouse bay 40, as in step 72, will begin to recharge the mouse battery 60.

Figure 7:
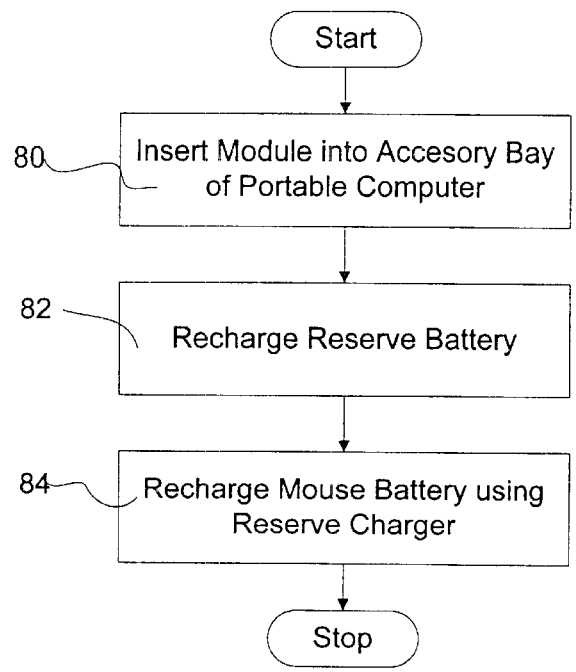
FIG. 7 is a flow chart of an alternative process to recharge the battery in the mouse.

FIG. 7 is a flowchart of an alternative process to recharge the mouse battery. In step 80, the module 30 is inserted into the accessory bay of the portable computer 10. Then the battery charger 22 of the portable computer charges the reserve battery 36 in step 82. Then in step 84, the mouse battery 60 is recharged using the reserve charger 34. When the reserve battery 36 and reserve charger 34 are included in module 30, mouse battery 60 can be recharged whether the module 30 is inserted into portable computer 10 or not.

What is claimed is:

1. A portable computer system, comprising:
    a base housing having an accessory bay, a first wireless transceiver, and a battery charger coupled to said accessory bay;
    a screen attached to said base, said screen capable of displaying a cursor in response to data from said first wireless transceiver;
    a module capable of insertion into and removal from said accessory bay, said module having a mouse bay and a connector for coupling to said battery charger;
    a mouse having a battery and a second wireless transceiver for contact with said first wireless transceiver for positioning said cursor on said screen, said battery capable of recharging when said mouse is placed in said mouse bay of said module.

2. The portable computer of claim 1 wherein said battery of said mouse is recharged when said module is fitted in said accessory bay.

3. The portable computer of claim 1 wherein said mouse is collapsible and said mouse is stored in said mouse bay when said mouse is collapsed.

4. A portable computer system, comprising:
    a base housing having an accessory bay, a first wireless transceiver, and a battery charger coupled to said accessory bay;
    a screen attached to said base, said screen capable of displaying a cursor in response to data from said first wireless transceiver;
    a mouse having a battery and a second wireless transceiver for contact with said first wireless transceiver for positioning said cursor on said screen;
    a module capable of insertion into and removal from said accessory bay, said module having
        a mouse bay,
        a connector for coupling to said battery charger,
        a reserve battery coupled to said connector and
        a reserve battery charger having an input coupled to said reserve battery and an output coupled to said mouse bay wherein said reserve battery is recharged from said battery charger in said base and said battery in said mouse is recharged from said reserve battery charger when said mouse is placed in said mouse bay of said module.

5. The portable computer of claim 4 wherein said battery of said mouse is recharged when said module is not fitted in said accessory bay.

6. A module for insertion into and removal from a portable computer accessory bay, comprising:
    a connector for coupling with a battery charger in said portable computer; and
    a mouse bay coupled to said connector and said mouse bay capable of accepting a mouse having a battery wherein said battery of said mouse is recharged when said mouse is in said mouse bay.

7. A portable computer system, comprising:
    the module of claim 6;
    a base housing having an accessory bay capable of accepting said module, a first wireless transceiver and a battery charger coupled to said accessory bay;
    a screen attached to said base, said screen capable of displaying a cursor in response to data from said first wireless transceiver;
    a mouse having a battery and a second wireless transceiver for contact with said first wireless transceiver for positioning said cursor on said screen, said battery recharging when said mouse is placed in said mouse bay and said module is fitted in said accessory bay.

8. A module for insertion into and removal from a portable computer accessory bay, comprising:
    a connector coupling with a battery charger in said portable computer;
    a mouse bay coupled to said connector and said mouse bay capable of accepting a mouse having a battery wherein said batter y of said mouse is recharged when said mouse is in said mouse bay;
    a reserve battery coupled to said connector; and
    a reserve battery charger having an input coupled to said reserve battery and an output coupled to said mouse bay wherein said reserve battery is recharged from said battery charger in said base and said battery in said mouse is recharged from said reserve battery charger.

9. A portable computer system, comprising:
    a module for insertion into and removal from a portable computer accessory bay, comprising:
        a connector for coupling with a battery charger in said portable computer, and
        a mouse bay coupled to said connector and said mouse bay capable of accepting a mouse having a battery wherein said battery of said mouse is recharged when said mouse is in said mouse bay;
    a base housing having an accessory bay capable of accepting said module, a first wireless transceiver and a battery coupled to said accessory bay;
    a screen attached to said base, said screen capable of displaying a cursor in response to data from said first wireless transceiver;
    a mouse having a battery and a second wireless transceiver for contact with said first wireless transceiver for positioning said cursor on said screen, said battery recharging when said mouse is placed in said mouse bay and said module is fitted in said accessory bay;
    a reserve battery coupled to said connector; and
    a reserve battery charger having an input coupled to said reserve battery and an output coupled to said mouse bay wherein said reserve battery is recharged from said battery charger in said base and said battery in said mouse is recharged from said reserve battery charger.

10. A portable computer system, comprising:
    a base housing having an accessory bay, a first wireless transceiver and a battery charger coupled to said accessory bay;
    a screen attached to said base, said screen capable of displaying a cursor in response to data from said first wireless transceiver;
    a module capable of insertion into and removal from said accessory bay, said module having a mouse bay and a connector for coupling to said battery charger, a reserve battery coupled to said connector, a reserve battery charger having an input coupled to said reserve battery and an output coupled to said mouse bay wherein said reserve battery is recharged from said battery charger in said base and said battery in said mouse is recharged from said reserve battery charger; and
    a mouse having a battery and a second wireless transceiver for contact with said first wireless transceiver for positioning said cursor on said screen, said battery recharging when said mouse is placed in said mouse bay of said module.

11. A method of recharging a battery in a wireless mouse comprising the step of:

inserting the mouse into a mouse bay of a module that is capable of insertion into an accessory bay of a portable computer, the mouse bay coupled to a battery charger.

12. The method of claim 11, further comprising the step of collapsing the mouse before inserting the mouse into the module.

13. The method of claim 11, further comprising the step of inserting the module into an accessory bay of a portable computer.

14. The method of claim 11, wherein said module has a reserve battery and a reserve battery charger, the method further comprising the step of:

charging said battery of said mouse with said reserve battery charger.

15. The method of claim 14, further comprising the steps of:

inserting the module into an accessory bay of a portable computer; and recharging said reserve battery from said portable computer.

16. A portable computer, comprising:

a base housing having an accessory bay and a battery charger coupled to said accessory bay; and a module capable of insertion into and removal from said accessory bay, said module having, a mouse bay capable of accepting a mouse with a battery, a connector for coupling to the battery charger, a reserve battery coupled to the connector, and a reserve battery charger having an input coupled to the reserve battery and an output coupled to the mouse bay wherein the reserve battery is recharged from the battery charger in the base housing and the battery in the mouse is recharged from said reserve battery charger.

17. The portable computer of claim 16, further comprising:

a first wireless transceiver within the base housing for communicating with a second wireless transceiver within the mouse.

18. The portable computer of claim 17, further comprising:

a screen attached to the base, the screen capable of displaying a cursor in response to data from the first wireless transceiver.

* * * * *

UNITED STATES PATENT AND TRADEMARK OFFICE
CERTIFICATE OF CORRECTION

PATENT NO. : 6,476,795 B1
DATED : November 5, 2002
INVENTOR(S) : Derocher et al.

It is certified that error appears in the above-identified patent and that said Letters Patent is hereby corrected as shown below:

<u>Column 5,</u>
Line 44, delete "connector" and insert therefor -- connector; --.

<u>Column 6,</u>
Line 15, delete "batter y" and insert therefor -- battery --.

Signed and Sealed this

Ninth Day of December, 2003

JAMES E. ROGAN
*Director of the United States Patent and Trademark Office*